(12) United States Patent
Zakoji et al.

(10) Patent No.: US 9,904,155 B2
(45) Date of Patent: Feb. 27, 2018

(54) LIGHT SOURCE APPARATUS AND PROJECTOR

(71) Applicant: SEIKO EPSON CORPORATION, Tokyo (JP)

(72) Inventors: Makoto Zakoji, Matsumoto (JP); Takanao Enokishima, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/405,073

(22) Filed: Jan. 12, 2017

(65) Prior Publication Data
US 2017/0205694 A1 Jul. 20, 2017

(30) Foreign Application Priority Data

Jan. 20, 2016 (JP) .................................. 2016-008898

(51) Int. Cl.
| | |
|---|---|
| G03B 21/20 | (2006.01) |
| G03B 21/16 | (2006.01) |
| F21V 29/67 | (2015.01) |
| F21V 9/16 | (2006.01) |
| G02B 26/00 | (2006.01) |
| G03B 21/14 | (2006.01) |
| F21S 8/10 | (2006.01) |
| H04N 9/00 | (2006.01) |
| G02B 27/00 | (2006.01) |
| G03B 33/12 | (2006.01) |

(52) U.S. Cl.
CPC .............. *G03B 21/16* (2013.01); *F21S 48/00* (2013.01); *F21V 9/16* (2013.01); *F21V 29/673* (2015.01); *G02B 26/008* (2013.01); *G03B 21/142* (2013.01); *G03B 21/204* (2013.01); *G03B 21/2093* (2013.01); *H04N 9/00* (2013.01); *G02B 27/0006* (2013.01); *G03B 33/12* (2013.01)

(58) Field of Classification Search
CPC .................................................... G03B 21/204
See application file for complete search history.

(56) References Cited

U.S. PATENT DOCUMENTS

2013/0107231 A1* 5/2013 Ohsugi .................. G02B 7/003
353/85
2015/0131062 A1 5/2015 Nishimori et al.
(Continued)

FOREIGN PATENT DOCUMENTS

JP 2015-094860 A 5/2015

*Primary Examiner* — Sultan Chowdhury
*Assistant Examiner* — Danell L Owens
(74) *Attorney, Agent, or Firm* — Oliff PLC (57) ABSTRACT

The disclosure relates to a light source apparatus including a solid-state light source, a phosphor on which light emitted from the solid-state light source is incident, an optical system that guides the light emitted from the solid-state light source at least to the phosphor, an enclosure member having a first accommodation space that accommodates the phosphor and a second accommodation space that accommodates the optical system, and an air blowing mechanism that blows air into the first accommodation space, wherein the optical system includes a pickup lens on which fluorescence emitted from the phosphor is incident, and the first accommodation space and the second accommodation space are separated from each other by a holding member that holds the pickup lens.

10 Claims, 8 Drawing Sheets

(56) References Cited

U.S. PATENT DOCUMENTS

| | | | |
|---|---|---|---|
| 2016/0069558 A1* | 3/2016 | Hu | G02F 1/1336 362/84 |
| 2016/0077326 A1* | 3/2016 | Yamagishi | G02B 26/008 353/61 |

* cited by examiner

LIGHT SOURCE APPARATUS AND PROJECTOR

BACKGROUND

1. Technical Field

The present invention relates to a light source apparatus and a projector.

2. Related Art

In recent years, a projector uses a light source apparatus that is the combination of a solid-state light source that emits excitation light and a phosphor that absorbs the excitation light and converts the excitation light into light that belongs to a predetermined wavelength band. If dust adheres to the phosphor or an optical system that guides the light to the phosphor, the dust absorbs and scatters the light, possibly resulting in a decrease in light use efficiency.

To prevent the adhesion of dust, there is a known light source apparatus in which the phosphor and the optical system are accommodated in a casing that forms a hermetic space and part of a motor that rotates the phosphor protrudes out of the casing (see JP-A-2015-94860, for example).

In the light source apparatus described above, however, since the phosphor is disposed in the hermetic space, an increase in the temperature in the casing also increases the temperature of the phosphor itself. If the temperature of the phosphor increases, the fluorescence conversion efficiency undesirably decreases, resulting in a problem of a decrease in brightness of a displayed image.

Further, since part of the motor protrudes out of the casing, it is difficult to hold the motor having a structure in which the outer shape of the motor rotates in a state in which the motor is hermetically accommodated in the casing, possibly resulting in a decrease in light use efficiency when dust adheres to the phosphor or the optical system.

SUMMARY

An advantage of some aspects of the invention is to provide a light source apparatus and a projector capable of suppression of adhesion of dust to an optical member and generation of bright light.

According to first aspect of the invention, there is provided a light source apparatus including a solid-state light source, a phosphor on which light emitted from the solid-state light source is incident, an optical system that guides the light emitted from the solid-state light source at least to the phosphor, an enclosure member having a first accommodation space that accommodates the phosphor and a second accommodation space that accommodates the optical system, and an air blowing mechanism that blows air into the first accommodation space, wherein the optical system includes a pickup lens on which fluorescence emitted from the phosphor is incident, and the first accommodation space and the second accommodation space are separated from each other by a holding member that holds the pickup lens.

According to the light source apparatus described above, the holding member can simply and reliably form a space that can accommodate the phosphor and the optical system in a hermetic manner. Further, since cooling the phosphor allows suppression of a decrease in fluorescence conversion efficiency resulting from an increase in temperature, bright light can be generated. Moreover, since the holding member is used to separate the first accommodation space and the second accommodation space from each other, the pickup lens and the phosphor can be so disposed as to be close to each other. The fluorescence emitted from the phosphor can therefore be satisfactorily picked up through the pickup lens, whereby bright light can be generated.

Therefore, according to the first aspect of the invention, a light source apparatus capable of not only suppression of adhesion of dust to the phosphor and the optical system but also generation of bright light can be provided.

In the first aspect described above, it is preferable that the light source apparatus further includes an elastic member that is sandwiched between the holding member and the enclosure member.

According to the configuration described above, the elastic member can improve the hermetic state of the first accommodation space and the second accommodation space.

In the first aspect described above, it is preferable that the air blowing mechanism feeds air toward the first accommodation space.

For example, in a case where air is discharged out of the first accommodation space to cool the phosphor, the pressure in the first accommodation space becomes negative. Therefore, even a slight gap between the holding member and the second accommodation space undesirably causes air in the second accommodation space to be also discharged. That is, since the pressure in the second accommodation space also becomes negative, air in the light source apparatus is sucked through any other gap into the second accommodation space. In this process, dirt and dust around the gap is also sucked and possibly adhere to the optical system. The output from the light source apparatus therefore possibly decreases.

To avoid the problem described above, employing the configuration according to the aspect of the invention allows the pressure in the accommodation space to become positive, no air is sucked into the second accommodation space, whereby a decrease in the output from the light source apparatus resulting from adhesion of dirt and dust can be avoided.

In the first aspect described above, it is preferable that the phosphor is provided in a ring shape on a rotatable disk.

According to the configuration described above, rotation of the disk allows the position where the light is incident on the phosphor to be changed. An increase in the temperature of the phosphor can therefore be suppressed.

Further, the enclosure member preferably has a wall section facing the phosphor and flush with a phosphor-side end surface of the pickup lens.

Provision of the wall section reduces the size of a gap created between the pickup lens and the phosphor, whereby noise produced when the disk is rotated can be suppressed.

In the first aspect described above, it is preferable that the light source apparatus further includes a position adjuster capable adjusting a position of the phosphor relative to the pickup lens.

According to the configuration described above, moving only the phosphor relative to the pickup lens allows adjustment of the positional relationship between the phosphor and the pickup lens without the hermetic state of the first accommodation space and the second accommodation space affected.

According to a second aspect of the invention, there is provided a projector including the light source apparatus according to the first aspect described above, a light modulator that modulates light from the light source apparatus in accordance with image information to form image light, and a projection system that projects the image light.

The projector according to the second aspect described above, which includes the light source apparatus described above, can display a bright image.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described below in detail with reference to the drawings.

In the drawings used in the following description, a characteristic portion is enlarged for convenience in some cases for clarity of the characteristic thereof, and the dimension ratio and other factors of each component are therefore not always equal to actual values.

Projector

An example of a projector 1 shown in FIG. 1 will first be described.

Figure 1:
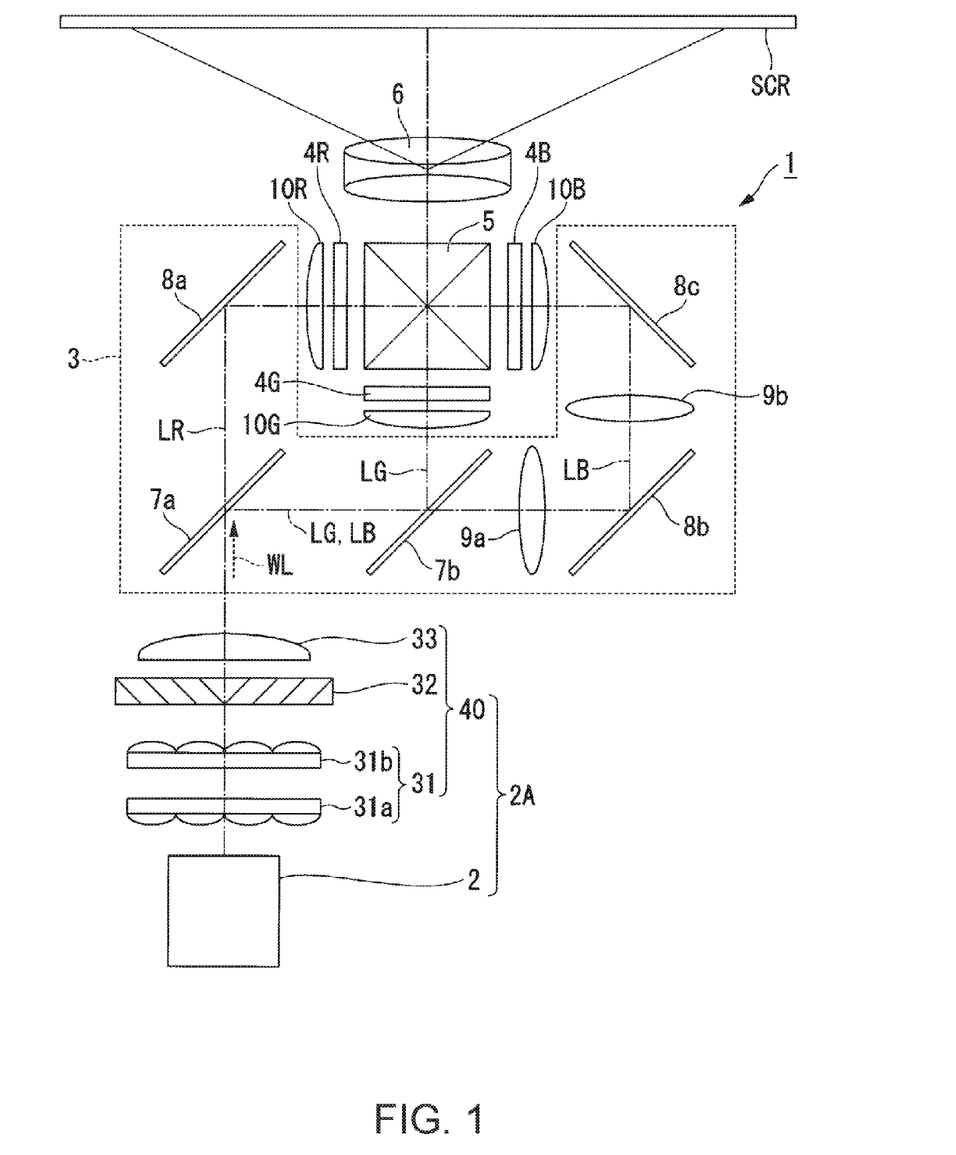
FIG. 1 is a plan view showing a schematic configuration of a projector.

FIG. 1 is a plan view showing a schematic configuration of the projector 1.

The projector 1 according to the present embodiment is a projection-type image display apparatus that displays color video images (images) on a screen SCR. The projector 1 uses three light modulators corresponding to color light fluxes, red light LR, green light LG, and blue light LB. The projector 1 uses a semiconductor laser (solid-state light source), which generates high-luminance, high-intensity light, as a light source of an illuminator.

Specifically, the projector 1 generally includes an illuminator 2A, a color separation system 3, a light modulator 4R, a light modulator 4G, a light modulator 4B, a light combining system 5, and a projection system 6, as shown in FIG. 1.

The illuminator 2A outputs illumination light WL toward the color separation system 3. The illuminator 2A includes a light source apparatus 2 and a homogenizing illumination system 40.

The homogenizing illumination system 40 includes an optical integration system 31, a polarization conversion element 32, and a superimposing system 33. The polarization conversion element 32 is not essentially required.

The optical integration system 31 is formed, for example, of a lens array 31a and a lens array 31b. Each of the lens arrays 31a and 31b is formed of a plurality of lenses arranged in an array.

The illumination light WL having passed through the optical integration system 31 is incident on the polarization conversion element 32. The polarization conversion element 32 is formed, for example, of a polarization separation film and a retardation film and converts the illumination light WL into linearly polarized light.

The illumination light WL having passed through the polarization conversion element 32 is incident on the superimposing system 33. The superimposing system 33 is formed, for example, of a superimposing lens and superimposes the illumination light WL having exited out of the polarization conversion element 32 on an illuminated area. In the present embodiment, the optical integration system 31 and the superimposing system 33 homogenize the illumination distribution in the illuminated area.

The illumination light WL thus having exited out of the light source apparatus 2 is incident on the color separation system 3 with the intensity distribution of the illumination light WL homogenized over the illuminated area.

The color separation system 3 is intended to separate the illumination light WL into the red light LR, the green light LG, and the blue light LB. The color separation system 3 generally includes a first dichroic mirror 7a and a second dichroic mirror 7b, a first total reflection mirror 8a, a second total reflection mirror 8b, and a third total reflection mirror 8c, and a first relay lens 9a and a second relay lens 9b.

The first dichroic mirror 7a has the function of separating the illumination light WL from the light source apparatus 2 into the red light LR and the other light fluxes (green light LG and blue light LB). The first dichroic mirror 7a transmits the separated red light LR but reflects the other light fluxes (green light LG and blue light LB). On the other hand, the second dichroic mirror 7b has the function of separating the other light fluxes into the green light LG and blue light LB. The second dichroic mirror 7b reflects the separated green light LG but transmits the blue light LB.

The first total reflection mirror 8a is disposed in the optical path of the red light LR and reflects the red light LR having passed through the first dichroic mirror 7a toward the light modulator 4R. On the other hand, the second total reflection mirror 8b and the third total reflection mirror 8c are disposed in the optical path of the blue light LB and reflect the blue light LB having passed through the second dichroic mirror 7b toward the light modulator 4B. No total reflection mirror needs to be disposed in the optical path of the green light LG, and the green light LG is reflected off the second dichroic mirror 7b toward the light modulator 4G.

The first relay lens 9a and the second relay lens 9b are disposed in the optical path of the blue light LB and on the light exiting side of the second dichroic mirror 7b. The first relay lens 9a and the second relay lens 9b have the function of compensating optical loss of the blue light LB resulting from the fact that the optical path length of the blue light LB is longer than the optical path lengths of the red light LR and the green light LG.

The light modulator 4R modulates the red light LR passing therethrough in accordance with image information to form image light corresponding to the red light LR. The light modulator 4G modulates the green light LG passing therethrough in accordance with image information to form image light corresponding to the green light LG. The light modulator 4B modulates the blue light LB passing therethrough in accordance with image information to form image light corresponding to the blue light LB.

Each of the light modulator 4R, the light modulator 4G, and the light modulator 4B is, for example, a transmissive liquid crystal panel. A pair of polarizers (not shown) are disposed on the light incident side and the light exiting side of the liquid crystal panel and pass only light linearly polarized in a specific direction.

Field lenses 10R, 10G, and 10B are disposed on the light incident side of the light modulators 4R, 4G, and 4B, respectively. The field lenses 10R, 10G, and 10B are intended to parallelize the red light LR, the green light LG, and the blue light LB incident on the light modulators 4R, 4G, and 4B, respectively.

The light combining system 5, on which image light fluxes from the light modulators 4R, 4G, and 4B are incident, combines the image light fluxes corresponding to the red light LR, the green light LG, and the blue light LB with one another and causes the combined image light to exit toward the projection system 6. The light combining system 5 is, for example, a cross dichroic prism.

The projection system 6 is formed of a projection lens group. The projection system 6 enlarges the combined image light from the light combining system 5 and projects the enlarged image light toward the screen SCR. Enlarged color video images (images) are thus displayed on the screen SCR.

Light Source Apparatus

A specific embodiment of the light source apparatus to which an aspect of the invention is applied and which is used in the illuminator 2A described above will next be described.

Figure 2:
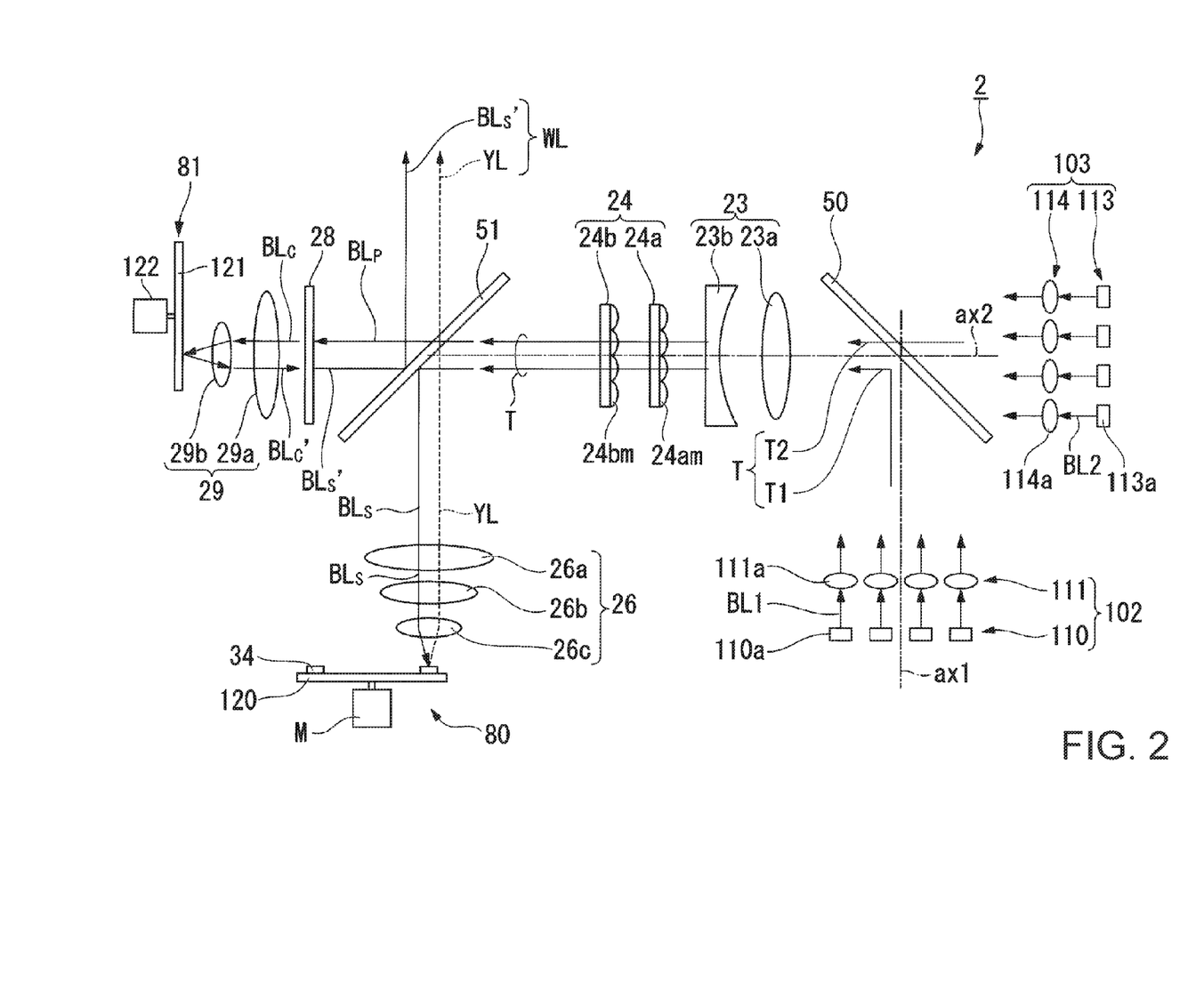
FIG. 2 shows the optical configuration of a light source apparatus.

FIG. 2 shows the optical configuration of the light source apparatus 2.

The light source apparatus 2 includes a first light source unit 102, a second light source unit 103, a first polarization separation element 50, an afocal system 23, a homogenizer system 24, a second polarization separation element 51, a first pickup lens unit 26, a phosphor wheel 80, a retardation film 28, a second pickup lens unit 29, and a diffuser wheel 81, as shown in FIG. 2.

The first light source unit 102 includes a first array light source 110 and a collimator system 111. The first array light source 110 includes a plurality of semiconductor lasers 110a, each of which serves as a solid-state light source. The plurality of semiconductor lasers 110a are arranged in an array in a plane perpendicular to an optical axis ax1. Each of the semiconductor lasers 110a emits, for example, a blue light beam BL1 (laser light having peak wavelength of 445 nm, for example). In the present embodiment, the light beam BL1 is light corresponding to an S polarization component with respect to the first polarization separation element 50, which will be described later.

The light emitted from the first array light source 110 is incident on the collimator system 111. The collimator system 111 converts a light beam flux formed of a plurality of light beams BL1 emitted from the first array light source 110 into a parallelized light flux. The collimator system 111 is formed, for example, of a plurality of collimator lenses 111a arranged in an array. The plurality of collimator lenses 111a are disposed in correspondence with the plurality of semiconductor lasers 110a.

On the other hand, the second light source unit 103 includes a second array light source 113 and a collimator system 114. The second array light source 113 is formed of a plurality of semiconductor lasers 113a, and the collimator system 114 is formed of a plurality of collimator lenses 114a. The plurality of semiconductor lasers 113a are arranged in an array in a plane perpendicular to an optical axis ax2.

The second array light source 113 and the collimator system 114 have the same configurations as those of the first array light source 110 and the collimator system 111 in the first light source unit 102 described above and will not therefore be descried. In the present embodiment, a light beam BL2 corresponds to a P polarization component with respect to the first polarization separation element 50, which will be described later.

The first polarization separation element 50 reflects the S-polarized component light (light beams BL1) outputted from the first light source unit 102 but transmits the P-polarized component light (light beams BL2) outputted from the second light source unit 103. As a result, a first light beam flux T1 formed of the plurality of light beams BL1 outputted from the first light source unit 102 and a second light beam flux T2 formed of the plurality of light beams BL2 outputted from the second light source unit 103 are combined with each other to form a combined light beam flux T.

The combined light beam flux T is incident on the afocal system 23. The afocal system 23 adjusts the light flux diameter of the combined light beam flux T. The afocal system 23 is formed, for example, of a convex lens 23a and a concave lens 23b.

The combined light beam flux T having passed through the afocal system 23 is incident on the homogenizer system 24. The homogenizer system 24 is formed, for example, of a first lens array 24a and a second lens array 24b. The first lens array 24a includes a plurality of first lenslets 24am, and the second lens array 24b includes a plurality of second lenslets 24bm.

The combined light beam flux T having passed through the homogenizer system 24 is incident on the second polarization separation element 51. The second polarization separation element 51 has a polarization separation function of separating the combined light beam flux T into the S-polarized component and the P-polarized component with respect to the second polarization separation element 51. Specifically, the second polarization separation element 51 reflects the S-polarized component of the light incident thereon but transmits the P-polarized component of the incident light. The S-polarized component (light beam flux BLs) is reflected off the second polarization separation element 51 and directed toward the phosphor wheel 80. The P-polarized component (light beam flux BLp) passes through the second polarization separation element 51 and travels toward the diffuser wheel 81.

A rotatable half-wave plate may, for example, be disposed between the homogenizer system 24 and the second polarization separation element 51. According to this configuration, appropriately setting the angle of rotation of the half-wave plate allows the ratio between the S-polarized component and the P-polarized component in the combined light beam flux T having passed through the half-wave plate to be changed. That is, the amount of light incident on each of the phosphor wheel 80 and the diffuser wheel 81 can be adjusted.

The second polarization separation element 51 has a color separation function of transmitting fluorescence YL, which belongs to a wavelength band different from the wavelength band to which the light beam flux BLs belongs, irrespective of the state of the polarization of the fluorescence YL. The second polarization separation element 51 further has a light combining function of combining light reflected off the diffuser wheel 81, which will be described later, with the fluorescence YL.

The light beam flux BLs formed of the S-polarized component and having exited out of the second polarization separation element 51 is incident on the first pickup lens unit 26. The first pickup lens unit 26 collects the light beam flux BLs and directs the collected light beam flux BLs toward a phosphor 34 on the phosphor wheel 80. The first pickup lens unit 26 further cooperates with the homogenizer system 24 to homogenize the illuminance distribution of the light beam flux BLs on the phosphor 34. The first pickup lens unit 26 is formed, for example, of pickup lenses 26*a*, 26*b*, and 26*c*. The pickup lenses 26*a*, 26*b*, and 26*c* correspond to the "pickup lens" set forth in the appended claims.

The light beam flux BLs having exited out of the first pickup lens unit 26 is incident on the phosphor wheel 80.

The phosphor wheel 80 has a disk 120, the phosphor 34, formed in a ring shape on the disk 120, and a motor M, which rotates the disk 120. The disk 120 is formed of a metal member that excels in heat dissipation capability.

The phosphor 34 contains phosphor particles that absorb laser light as excitation light, converts the excitation light into yellow fluorescence, and allows the fluorescence to exit. The phosphor particles can, for example, be a YAG-based (yttrium-aluminum-garnet-based) phosphor. The phosphor particles may be made of one material, or mixed particles formed by using at least two materials may be used as the phosphor particles.

In the present embodiment, since laser light is used as the excitation light, the temperature of the phosphor wheel 80 (phosphor 34) tends to increase. When the temperature of the phosphor 34 increases, the efficiency of conversion into the fluorescence YL lowers, and the amount of generated fluorescence decreases accordingly. In the present embodiment, the rotation of the disk 120 changes the position where the excitation light (light beam flux BLs) is incident on the phosphor 34. As a result, heat-related damage that occurs when the excitation light is continuously incident on the same portion of the phosphor 34 and other problems are avoided.

A reflector (not shown) is provided between the disk 120 and the phosphor 34. The thus configured phosphor wheel 80 reflects the fluorescence YL generated by the phosphor 34 upward.

In the present embodiment, the phosphor 34 on the phosphor wheel 80 is disposed in the focal position of the first pickup lens unit 26. The first pickup lens unit 26 and the phosphor 34 are so disposed as to be close to each other, as will be described later. The first pickup lens unit 26 can therefore satisfactorily pick up the fluorescence YL emitted from the phosphor 34.

On the other hand, the light beam flux BLp formed of the P-polarized component and having exited out of the second polarization separation element 51 is incident on the retardation film 28. The retardation film 28 is formed of a quarter-wave plate (λ/4 plate). The light beam flux BLp is converted into circularly polarized light beam flux BLc when passing through the retardation film 28. The light beam flux BLc having passed through the retardation film 28 is incident on the second pickup lens unit 29.

The second pickup lens unit 29 collects the light beam flux BLc and directs the collected light beam flux BLp toward the diffuser wheel 81. The second pickup lens unit 29 is formed, for example, of two pickup lenses 29*a* and 29*b*. The second pickup lens unit 29 cooperates with the homogenizer system 24 to homogenize the illuminance distribution of the light beam flux BLc on the diffuser wheel 81. In the present embodiment, the diffuser wheel 81 is disposed in the focal position of the second pickup lens unit 29.

The diffuser wheel 81 diffuses the light beam flux BLc having exited out of the second pickup lens unit 29 and reflects the diffused light beam flux BLc toward the second polarization separation element 51. The light diffused by and reflected off the diffuser wheel 81 is referred to as a light beam flux BLc'.

The diffuser wheel 81 includes a diffusive reflector 121 and a motor 122 for rotating the diffusive reflector 121. The diffusive reflector 121 is formed, for example, by formation of irregularities in a surface of a member having light reflectivity. The diffusive reflector 121 is formed in a circular shape when viewed along the direction of the axis of rotation thereof.

The circularly polarized light beam flux BLc' (diffused light) having been reflected off the diffuser wheel 81 and having passed through the second pickup lens unit 29 again passes through the retardation film 28 again and forms S-polarized light beam flux BLs'.

The light beam flux BLs is combined with the fluorescence YL having passed through the second polarization separation element 51. White illumination light WL is thus generated. The thus configured light source apparatus 2 causes the illumination light WL to be incident on the homogenizing illumination system 40 (optical integration system 31) shown in FIG. 1.

In the light source apparatus 2 according to the present embodiment, since the first light source unit 102 and the second light source unit 103 output laser light having a high energy density as described above, an optical dust collection effect is likely to occur in a particularly notable manner. Specifically, foreign matter (dirt and dust, for example) adheres to the surfaces of a variety of optical members (optical system 112), the phosphor wheel 80, and the phosphor 34 disposed in the light source apparatus 2. As a result, the transmittance of the components described above lowers, and the intensity of the illumination light WL decreases accordingly. A problem of a decrease in the image quality provided by the projector 1 is therefore likely to occur.

In contrast, the light source apparatus 2 according to the present embodiment, in which the optical system 112 and the phosphor wheel 80 are accommodated in a highly hermetic space, suppresses adhesion of foreign matter resulting from the optical dust collection effect.

Figure 3:
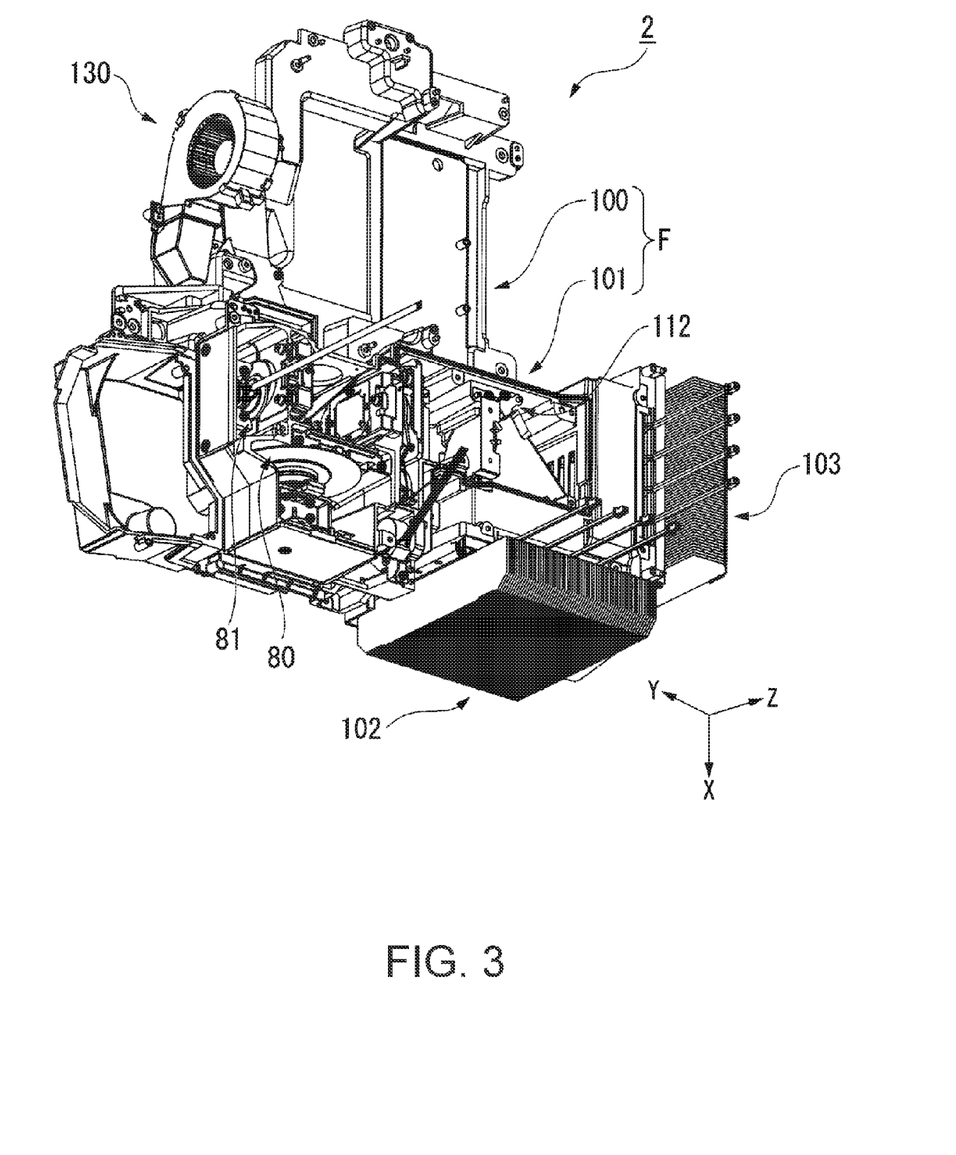
FIG. 3 shows a frame structure of the light source apparatus.

FIG. 3 shows a frame structure of the light source apparatus 2. In the following drawings, an XYZ coordinate system is used for ease of illustration. The direction X corresponds to the light exiting direction in the light source apparatus 2. The direction Y corresponds to the direction in which the light outputted from the first light source unit 102 and the second light source unit 103 (combined light beam flux T shown in FIG. 2) travels. The direction Z corresponds to the direction perpendicular to the directions X and Y.

The light source apparatus 2 has a frame structure F, as shown in FIG. 3. The frame structure F includes a base section 100 and an enclosure member 101. The enclosure member 101 holds the first light source unit 102, the second light source unit 103, the phosphor wheel 80, the diffuser wheel 81, and the optical system 112. The enclosure member 101 is attached to the base section 100.

Figure 4:
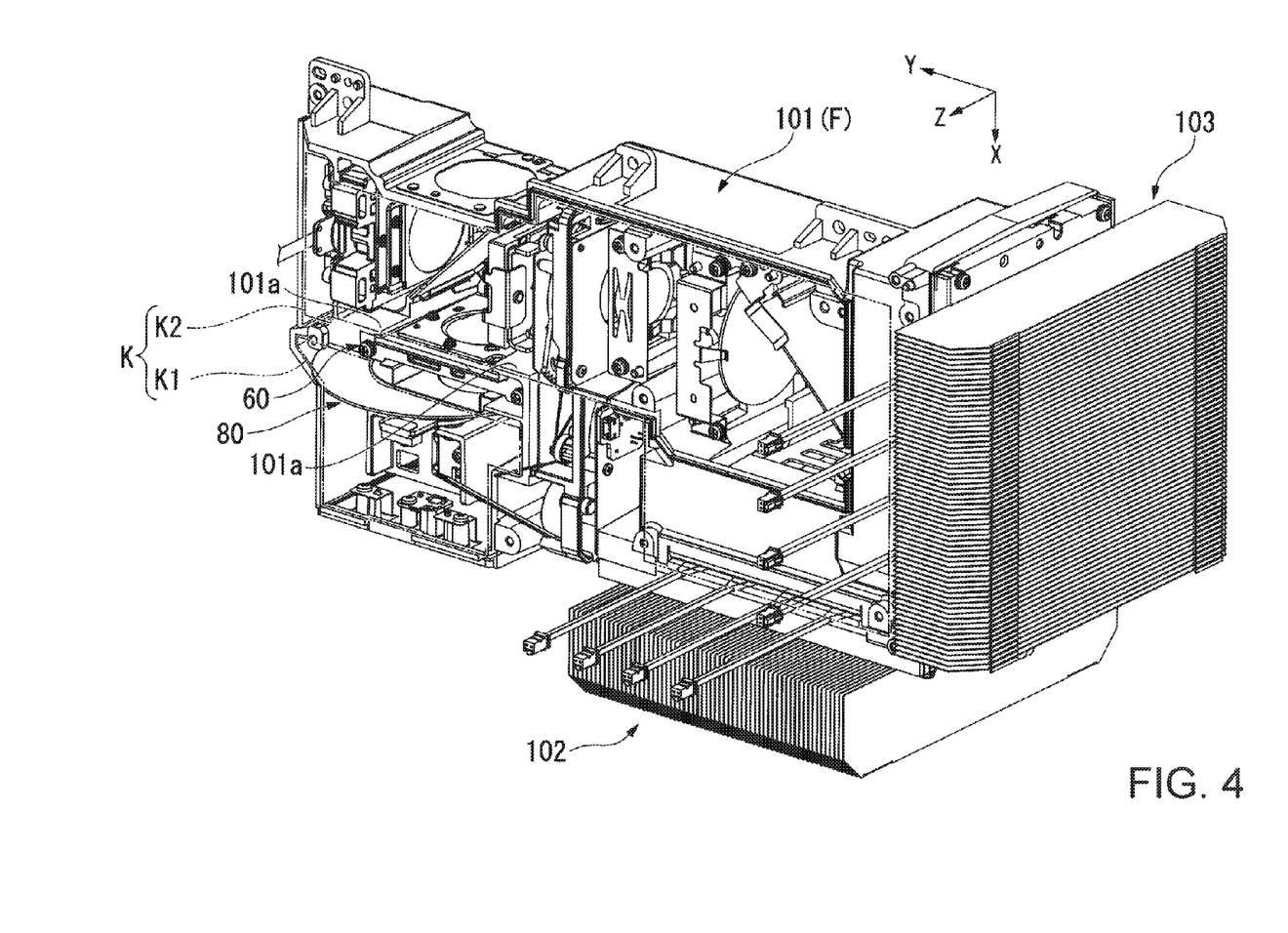
FIG. 4 shows an enclosure member of the frame structure.

FIG. 4 shows the enclosure member of the frame structure.

The enclosure member 101 has an elongated shape along the direction Y, and the upper surface of the enclosure member 101 is so closed with a lid member that is not shown that an accommodation space K is formed, as shown in FIG. 4. The accommodation space K includes a first accommodation space K1 and a second accommodation space K2. Bottom plates that close the first accommodation space K1 and the second accommodation space K2 are partially formed of the base section 100 described above.

The first accommodation space K1 is intended to accommodate the phosphor wheel 80. The second accommodation space K2 is intended to accommodate the optical system 112 and the diffuser wheel 81.

In the present embodiment, since the phosphor wheel is accommodated in the first accommodation space K1, adhesion of foreign matter to the phosphor wheel 80 is suppressed. Further, since the optical system 112 and the diffuser wheel 81 are accommodated in the second accommodation space K2, adhesion of foreign matter to the optical system 112 and the diffuser wheel 81 is suppressed. In the present embodiment, at least part (collimator systems 111 and 114) of the first light source unit 102 and the second light source unit 103 is accommodated in the second accommodation space K2 described above.

The optical system 112 shown in FIG. 4 includes a variety of optical members that guide the light outputted from the first light source unit 102 to the phosphor wheel 80 and further guide the light outputted from the second light source unit 103 to the diffuser wheel 81. Specifically, the variety of optical members include the first polarization separation element 50, the afocal system 23, the homogenizer system 24, the second polarization separation element 51, the first pickup lens unit 26, the retardation film 28, and the second pickup lens unit 29 shown in FIG. 2.

In the present embodiment, a holder (holding member) that holds the first pickup lens unit 26 is used to separate the first accommodation space K1 and the second accommodation space K2 from each other.

Figure 5:
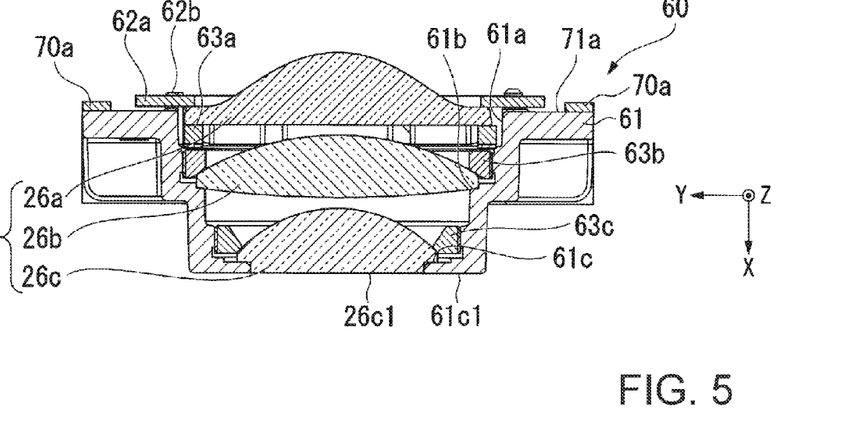
FIG. 5 is a cross-sectional view showing a key part configuration of a holder.
Figure 6:
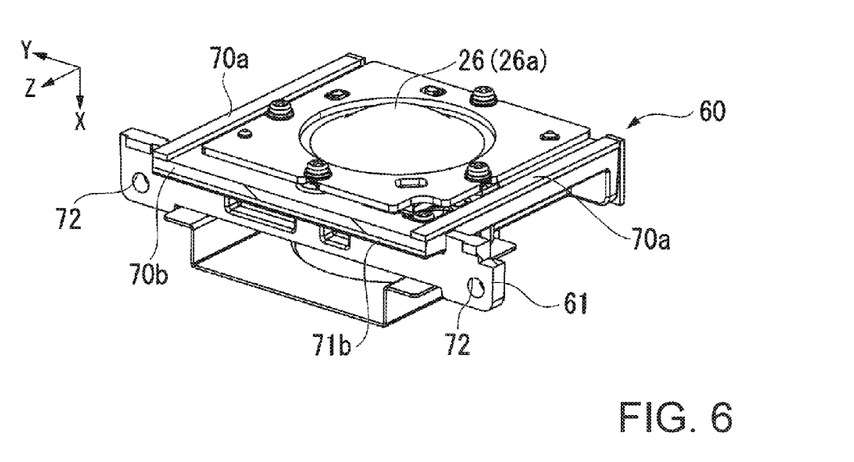
FIG. 6 is a perspective view showing the key part configuration of the holder.
Figure 7:
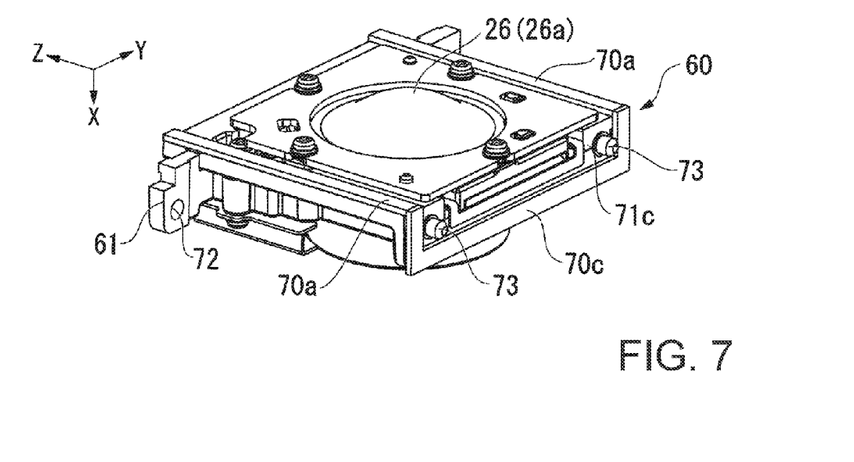
FIG. 7 is a perspective view showing the key part configuration of the holder.

FIG. 5 is a cross-sectional view showing a key part configuration of the holder, and FIGS. 6 and 7 are perspective views showing the key part configuration of the holder.

A holder 60 holds the first pickup lens unit 26, which is formed of the three pickup lenses 26a, 26b, and 26c (hereinafter referred to as lenses 26a, 26b, and 26c in some cases), as shown in FIG. 5. The effective diameters of the lenses 26a, 26b, and 26c decrease as the distance therefrom to the phosphor wheel 80 decreases. That is, the pickup lens 26a has a size greater than the sizes of the pickup lenses 26b and 26c, and the pickup lens 26b has a size greater than the size of the pickup lens 26c.

The holder 60 has a body section 61 having cylindrical lens holding surfaces. The body section 61 has holding sections 61a, 61b, and 61c, which hold the lenses 26a, 26b, and 26c, respectively. The pickup lens 26a is held by the holding section 61a via fixing members 62a and 63a. The pickup lens 26b is held by the holding section 61b via a fixing member 63b. The pickup lens 26c is held by the holding section 61c via a fixing member 63c. The fixing member 62a is fixed to the body section 61 with screw members 62b. It is assumed that each of the fixing members is in satisfactorily intimate contact with the corresponding lens.

The pickup lens 26c has a +X-side end surface 26c1, which is flush with a surface 61c1 of the body section 61 (holding section 61c). That is, the surface 61c1 of the holding section 61c and the end surface 26c1 of the pickup lens 26c are disposed in the same position in the direction X and therefore create no step in the direction X.

In the holder 60, elastic members 70a are disposed on a −X-side end surface 71a of the body section 61. The holder 60 comes into contact with a contact section 101a of the enclosure member 101 via the elastic members 70a (see FIG. 4).

In the holder 60, an elastic member 70b is disposed on a +Z-side end surface 71b of the body section 61, as shown in FIGS. 6 and 7. The holder 60 is therefore in satisfactorily intimate contact with a lid that is not shown but is part of the enclosure member 101.

Further, in the holder 60, an elastic member 70c is disposed on a −Z-side end surface 71c of the body section 61. The holder 60 is therefore in satisfactorily intimate contact with a bottom plate section of the enclosure member 101. The end surface 71b has screw attachment holes 72, through each of which a screw member used to fasten the holder 60 to the enclosure member 101 passes (see FIG. 6). The end surface 71c has pin members 73, which position the holder 60 relative to the bottom plate section of the enclosure member 101 (see FIG. 7).

The thus configured holder 60 comes into contact with the enclosure member 101 via the elastic members 70a, 70b, and 70c to hermetically separate the first accommodation space K1 and the second accommodation space K2 from each other.

According to the present embodiment, since the holder 60 is used to separate the first accommodation space K1 and the second accommodation space K2 from each other, the first pickup lens unit 26 (pickup lens 26c), which is held by the holder 60, and the phosphor 34 can be so disposed as to be close to each other.

As a result, the pickup lens 26c is so disposed as to be close to the phosphor 34. The first pickup lens unit 26 can therefore satisfactorily pick up the fluorescence YL emitted from the phosphor 34.

Figure 8:
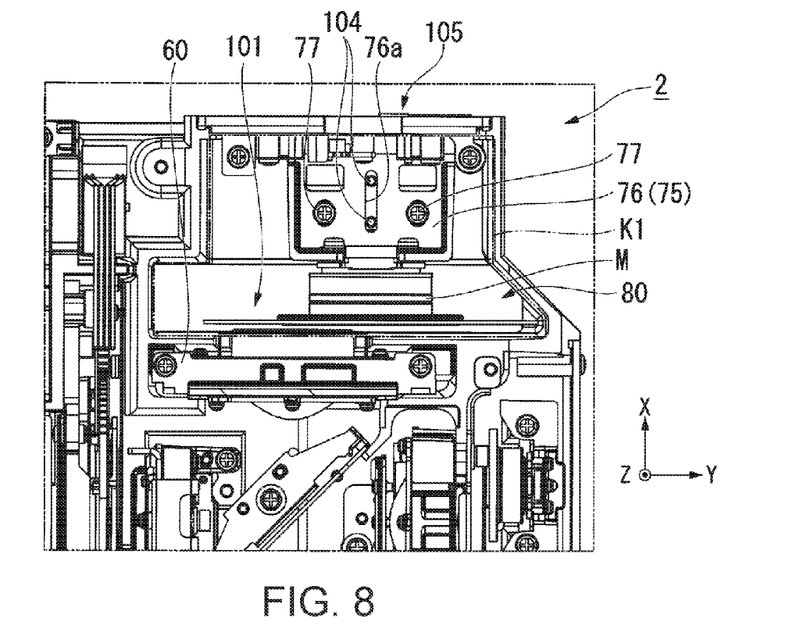
FIG. 8 is a key part enlarged view showing the configuration around a phosphor wheel.

FIG. 8 is a key part enlarged view showing the configuration around the phosphor wheel 80.

In the present embodiment, the light source apparatus 2 includes a position adjuster 75, which can adjust the position of the phosphor 34 relative to the first pickup lens unit 26, as shown in FIG. 8.

The position adjuster 75 has a motor holding section 76, which holds the motor M, which rotates the phosphor wheel 80. The motor holding section 76 has an elongated hole 76a, through which pin members 104 extending from the enclosure member 101 pass. The motor holding section 76 allows the pin members 104 to move along the longitudinal direction of the elongated hole 76a for adjustment of the position of the phosphor wheel 80 relative to the pickup lens 26c. Screw members 77 are then used to fix the motor holding section 76 to the enclosure member 101, whereby the phosphor wheel 80 and the first pickup lens unit 26 can be positioned relative to each other.

In the present embodiment, a +X-side side plate of the enclosure member 101 is provided with a sealing plate 105 in a portion corresponding to the first accommodation space K1. The sealing plate 105 is attachable to and detachable from the enclosure member 101, and removal of the sealing plate 105 allows external access to the position adjuster 75.

According to the present embodiment, since using the position adjuster 75 to move the holder 60 (phosphor wheel 80) allows adjustment of the position of the holder 60 relative to the pickup lens 26c, the sealing state of the first accommodation space K1 and the second accommodation space K2 is not affected.

In the present embodiment, the light source apparatus 2 is so configured that cooling air is supplied to the phosphor wheel 80. Cooling the phosphor 34 allows suppression of a decrease in the fluorescence conversion efficiency, and cooling the motor M allows a prolonged life of the motor M.

Specifically, in the present embodiment, the base section 100 shown in FIG. 3 includes an air blowing mechanism 130. The air blowing mechanism 130 is intended to supply the phosphor wheel 80 with cooling air to suppress a decrease in the efficiency at which the phosphor 34 is cooled. That is, the air blowing mechanism 130 supplies the first accommodation space K1, which accommodates the phosphor wheel 80, with cooling air.

Figure 9:
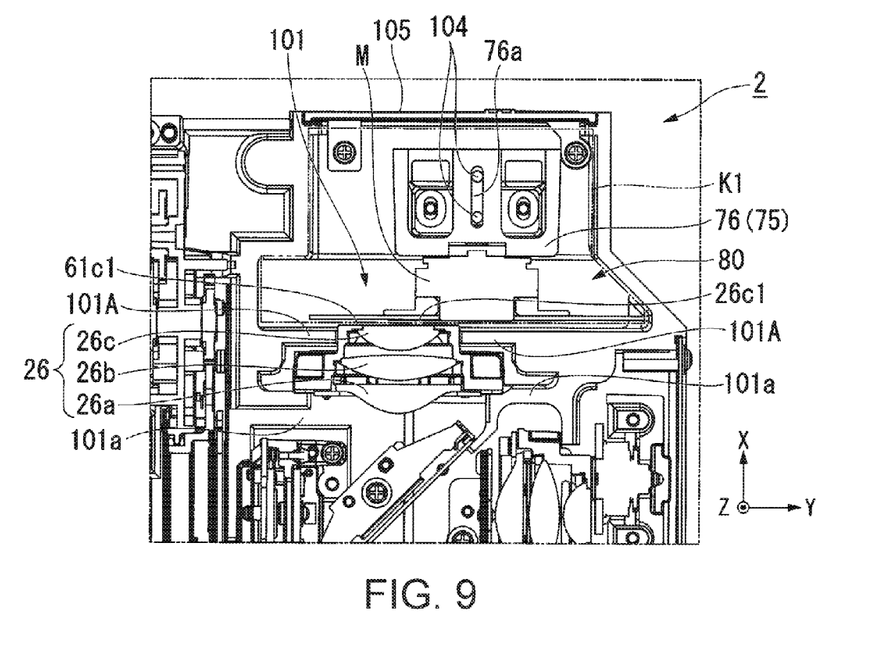
FIG. 9 is a key part enlarged cross-sectional view showing the configuration around the phosphor wheel.

FIG. 9 is a key part enlarged cross-sectional view showing the configuration around the phosphor wheel 80.

The enclosure member 101 has a wall section 101A, which faces the phosphor 34 on the phosphor wheel 80 and is flush with the end surface 26c1 of the pickup lens 26c, as shown in FIG. 9. That is, the surface 61c1 of the holding section 61c, the end surface 26c1 of the pickup lens 26c, and the wall section 101A are disposed in the same position in the direction X and create no step in the direction X.

According to the configuration described above, a substantially uniform gap is created between the phosphor wheel 80 and the pickup lens 26c, whereby occurrence of noise produced when the phosphor wheel 80 is rotated can be suppressed.

Figure 10:
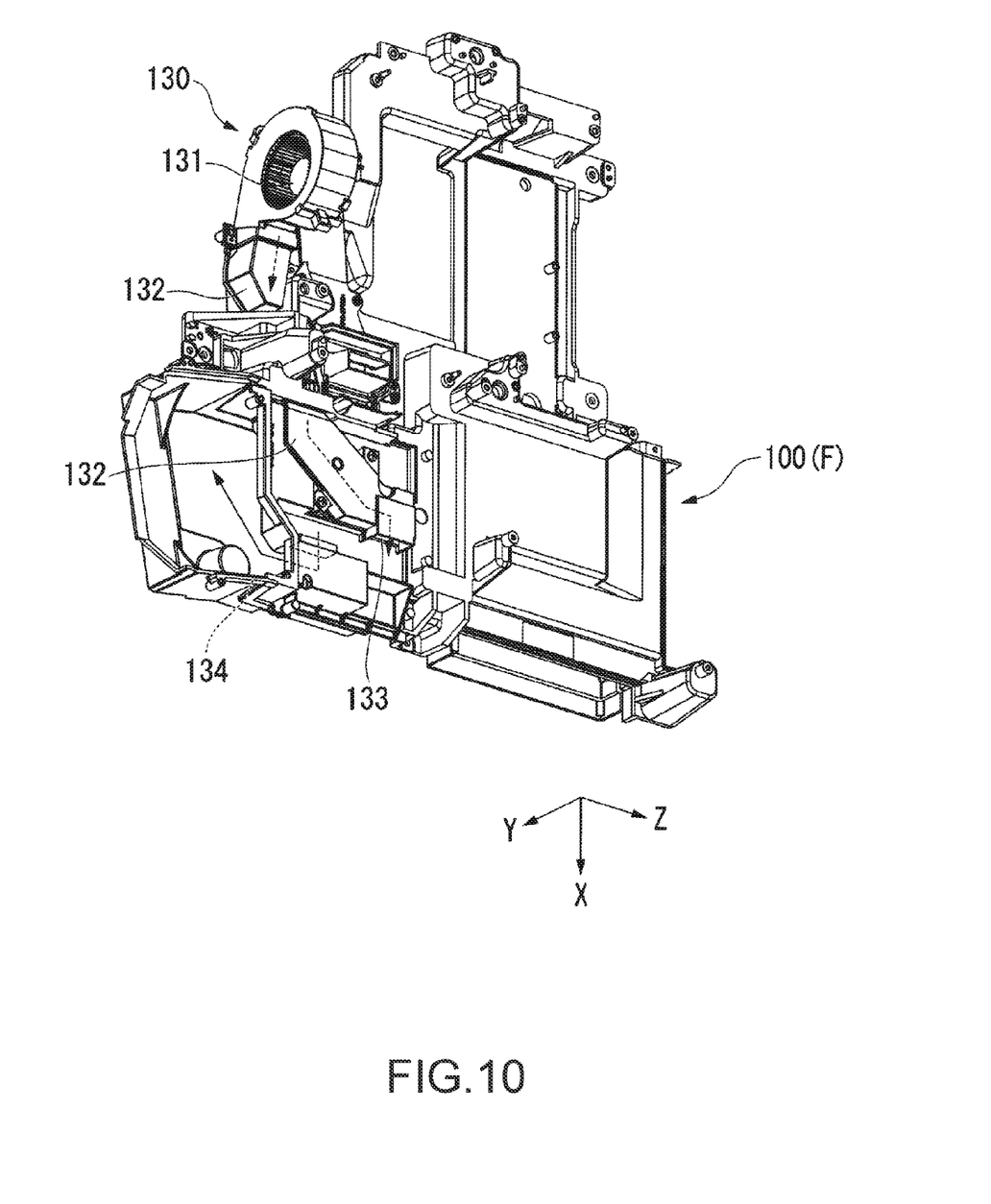
FIG. 10 shows the configuration of a base section.

FIG. 10 shows the configuration of the base section 100.

The air blowing mechanism 130 has an air blowing fan 131 and a duct 132, which guides air externally taken through the fan 131 into the first accommodation space K1, as shown in FIG. 10. The fan 131 is provided with a filter that is not shown at the air suction port, and the filter prevents foreign matter from entering the first accommodation space K1. The duct 132 is connected to an inlet port 133, which communicates with the first accommodation space K1. The base section 100 includes a discharge port 134, which communicates with the first accommodation space K1. In FIG. 10, the broken line represents the flow of air A taken through the fan 131.

Figure 11:
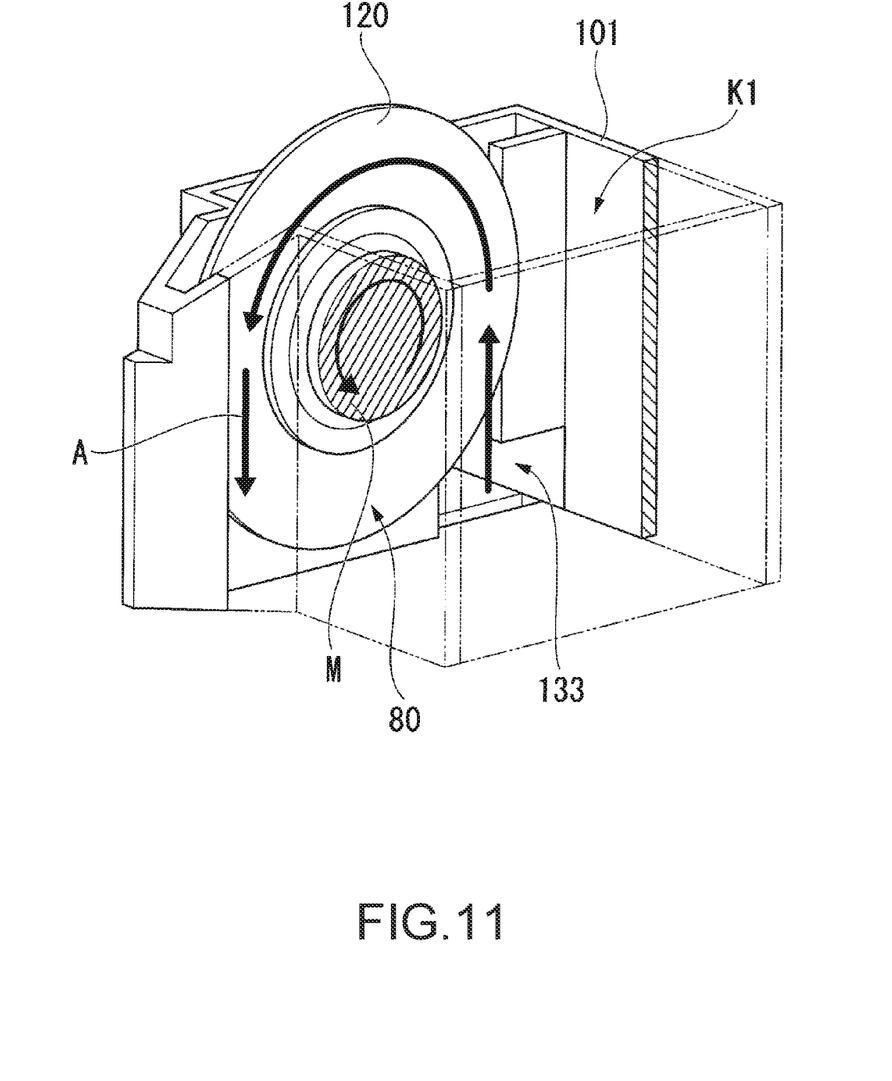
FIG. 11 shows the phosphor wheel viewed from the side facing a motor.

FIG. 11 shows the phosphor wheel 80, which is disposed in the first accommodation space K1, viewed from the side facing the motor M.

The inlet port 133 is located in an upstream position in the direction of rotation of the disk 120 of the phosphor wheel 80, as shown in FIG. 11. The air A introduced through the inlet port 133 rises and follows the rotation of the phosphor wheel 80, cools the phosphor 34 and the motor M, then turns around by 180° along the rotation direction of the disk 120, and exits out of the discharge port 134 (see FIG. 10). The configuration described above allows the phosphor 34 and the motor M to be simultaneously cooled, whereby improvement in the fluorescence emission efficiency and a prolonged life of the motor M can be simultaneously achieved.

In a case where the air is sucked out of the first accommodation space K1 to cool the phosphor wheel 80, the pressure in the first accommodation space K1 becomes negative. Therefore, even a slight gap between the holder 60 and the second accommodation space K2 undesirably causes the air in the second accommodation space K2 to be also discharged. That is, since the pressure in the second accommodation space K2 also becomes negative, air in the light source apparatus is sucked through any other gap into the second accommodation space K2. In this process, foreign matter around the gap is also sucked and possibly adheres to the optical system 112. The output from the light source apparatus 2 therefore possibly decreases.

In contrast, in the present embodiment, the air blowing mechanism 130 is configured to feed air into the first accommodation space K1. As a result, since the pressure in the first accommodation space K1 becomes positive, no air is sucked into the second accommodation space K2, whereby a decrease in the output from the light source apparatus 2 resulting from adhesion of foreign matter due to the optical dust collection effect can be suppressed.

As described above, according to the light source apparatus 2 of the present embodiment, the holder 60 can simply and reliably form a space that can accommodate the phosphor wheel 80 and the optical system 112 in a hermetic manner. Further, since cooling the phosphor wheel 80 allows suppression of a decrease in the efficiency of the conversion into the fluorescence YL resulting from an increase in the temperature, bright fluorescence YL can be generated. Moreover, since the holder 60 is used to separate the first accommodation space K1 and the second accommodation space K2 from each other, the first pickup lens unit 26 and the phosphor 34 can be so disposed as to be close to each other. The fluorescence YL emitted from the phosphor 34 can therefore be satisfactorily picked up through the pickup lenses, whereby bright light can be generated.

The light source apparatus 2 of the present embodiment can therefore suppress adhesion of dust to the phosphor 34 and the optical system 112 and generate bright light.

The projector 1 according to the present embodiment provided with the illuminator 2A including the light source apparatus 2 can therefore project a bright image that excels in display quality.

The technical range of the invention is not limited to the embodiment described above, and a variety of changes can be made to the embodiment to the extent that the changes do not depart from the substance of the invention.

For example, the embodiment described above has been described with reference to the case where the position adjuster 75, which can adjust the position of the phosphor 34 relative to the first pickup lens unit 26, is provided. Instead, a position adjuster capable of adjusting the position of the diffuser wheel 81 relative to the second pickup lens unit 29 may be provided.

The embodiment described above has been described with reference to the case where the light source apparatus according to the embodiment of the invention is used in a projector, but not necessarily. The light source apparatus according to the embodiment of the invention can also be used in a lighting device, such as an automobile headlight.

The entire disclosure of Japanese Patent Application No. 2016-008898, filed Jan. 20, 2016 is expressly incorporated by reference herein.

What is claimed is:

1. A light source apparatus comprising:
a solid-state light source;
a phosphor on which light emitted from the solid-state light source is incident;
an optical system that guides the light emitted from the solid-state light source at least to the phosphor;
an enclosure member having a first accommodation space that accommodates the phosphor and a second accommodation space that accommodates the optical system; and
an air blowing mechanism that blows air into the first accommodation space,
wherein the optical system includes a pickup lens on which fluorescence emitted from the phosphor is incident,
the first accommodation space and the second accommodation space are separated from each other by a holding member that holds the pickup lens, and
an elastic member is sandwiched between the holding member and the enclosure member.

2. The light source apparatus according to claim 1, wherein the air blowing mechanism feeds air toward the first accommodation space.

3. The light source apparatus according to claim 1, wherein the phosphor is provided in a ring shape on a rotatable disk.

4. The light source apparatus according to claim 3, wherein the enclosure member has a wall section facing the phosphor and flush with a phosphor-side end surface of the pickup lens.

5. The light source apparatus according to claim 1, further comprising a position adjuster capable adjusting a position of the phosphor relative to the pickup lens.

6. A projector comprising:
the light source apparatus according to claim 1;
a light modulator that modulates light from the light source apparatus in accordance with image information to form image light; and
a projection system that projects the image light.

7. A projector comprising:
the light source apparatus according to claim 2;
a light modulator that modulates light from the light source apparatus in accordance with image information to form image light; and
a projection system that projects the image light.

8. A projector comprising:
the light source apparatus according to claim 3;
a light modulator that modulates light from the light source apparatus in accordance with image information to form image light; and
a projection system that projects the image light.

9. A projector comprising:
the light source apparatus according to claim 4;
a light modulator that modulates light from the light source apparatus in accordance with image information to form image light; and
a projection system that projects the image light.

10. A projector comprising:
the light source apparatus according to claim 5;
a light modulator that modulates light from the light source apparatus in accordance with image information to form image light; and
a projection system that projects the image light.

* * * * *